(12) United States Patent
Potdar et al.

(10) Patent No.: US 8,626,790 B2
(45) Date of Patent: Jan. 7, 2014

(54) SYSTEM AND METHOD FOR PROCESSING AND ANALYZING DIMENSION DATA

(75) Inventors: Asha Kiran Potdar, Rocky Hill, CT (US); Harikrishna Raghumandala, Avon, CT (US); John Vernale, Burlington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 112 days.

(21) Appl. No.: 12/766,071

(22) Filed: Apr. 23, 2010

(65) Prior Publication Data

US 2011/0264618 A1    Oct. 27, 2011

(51) Int. Cl.
   *G06F 17/30*    (2006.01)
(52) U.S. Cl.
   USPC .................................................... 707/776
(58) Field of Classification Search
   USPC ......... 707/601, 606, 616, 636, 661, 706, 714, 707/721, 751, 759–776, 779–812, 707/999.001–999.01, 999.1, 707/999.101–999.107, 999.2–999.206
   See application file for complete search history.

(56) References Cited

U.S. PATENT DOCUMENTS

| | | | |
|---|---|---|---|
| 5,519,859 A | 5/1996 | Grace | |
| 5,983,215 A | 11/1999 | Ross et al. | |
| 6,480,836 B1 * | 11/2002 | Colby et al. | 707/717 |
| 6,847,973 B2 | 1/2005 | Griffin et al. | |
| 7,117,215 B1 | 10/2006 | Kanchwalla et al. | |
| 7,461,077 B1 * | 12/2008 | Greenwood | 1/1 |
| 8,260,822 B1 * | 9/2012 | Braden | 707/802 |
| 2004/0103013 A1 * | 5/2004 | Jameson | 705/7 |
| 2005/0125436 A1 * | 6/2005 | Mudunuri et al. | 707/102 |
| 2007/0061287 A1 | 3/2007 | Le et al. | |
| 2007/0203892 A1 | 8/2007 | Adams et al. | |
| 2008/0005078 A1 | 1/2008 | Dampier et al. | |
| 2008/0091471 A1 * | 4/2008 | Michon et al. | 705/3 |
| 2009/0193050 A1 | 7/2009 | Olson | |
| 2009/0276449 A1 | 11/2009 | Syed et al. | |

* cited by examiner

*Primary Examiner* — Hosain Alam
*Assistant Examiner* — Reza Hosseini
(74) *Attorney, Agent, or Firm* — Howard IP Law Group, PC

(57) ABSTRACT

A processor is operated to combine a first row of a dimension table in a data warehouse with a second row in the dimension table. The result is a combined row that includes a row identification key for the first row and a row identification key for the second row. The row identification key for the first row joins the combined row to fact data from a prior time period. The second row corresponds to a current time period that is later than the prior time period. The processor is also operated to join at least a portion of the combined row to at least a portion of the corresponding row in a fact table associated with the dimension table. The fact data from the prior time period is included in the corresponding row in the fact table.

11 Claims, 12 Drawing Sheets

| MO_END_SNPS_HT_DT_PK_ID | AGMT_GID | AGMT_PK_ID | NB_QUOTE_UNS_UCC_CNT | NB_OPEN_CNT | AGCY_PK_ID |
|---|---|---|---|---|---|
| 20060131 | 4098936 | 10112002251925 | 1 | 0 | 1010211284 73 |
| 20051231 | 4098936 | 10112002251925 | 1 | 0 | 1010211284 73 |
| 20051130 | 4098936 | 10112002251925 | 1 | 0 | 1010211284 73 |
| 20051031 | 4098936 | 10112002251925 | 1 | 0 | 1010211284 73 |
| 20050930 | 4098936 | 10112002251925 | 1 | 0 | 1010211284 73 |
| 20050831 | 4098936 | 10112002251925 | 1 | 0 | 1010211284 73 |
| 20050731 | 4098936 | 10112002251925 | 1 | 0 | 1010211284 73 |
| 20050630 | 4098936 | 10112002251925 | 1 | 0 | 1010211284 73 |
| 20050531 | 4098936 | 10112002251925 | 1 | 0 | 1010211284 73 |
| 20050430 | 4098936 | 10112002254876 9 | 0 | 0 | 1010211284 73 |
| 20050331 | 4098936 | 10112002297178 7 | 0 | 0 | 1010211284 73 |
| 20050228 | 4098936 | 10112002265579 9 | 0 | 1 | 1010211284 73 |
| 20050131 | 4098936 | | 0 | 1 | 1010211284 73 |

FACT TABLE

AGENCY DIMENSION TABLE (SIMPLIFIED) — 604

| AGCY_PK_ID | SRCE_EFF_START_TMSP | SRCE_EFF_END_TMSP | SRCE_SYS_CD | AGCY_GID | AGCY_NM | AGCY_TERR_CD | AGCY_CD | PROD_RO_NM |
|---|---|---|---|---|---|---|---|---|
| 101021128473 | 1/1/1900 | 1/24/2010 | SLS | 124726 | ACME CO. | 12 | 113 | OHIO |
| 1016200000001353 | 1/25/2010 | 12/31/9999 | SLS | 124726 | ZEN-ACME CO. | 12 | 113 | OHIO |

- 804 AGCY_PK_ID
- 806 SRCE_EFF_START_TMSP
- 808 SRCE_EFF_END_TMSP
- 810 SRCE_SYS_CD
- 812 AGCY_GID
- 802 AGCY_NM
- 814 AGCY_TERR_CD
- 816 AGCY_CD
- 818 PROD_RO_NM
- 820, 822

FIG. 9

HISTORY RESTATE VIEW (SIMPLIFIED) — 614

| AGCY_PK_ID_ORIG | AGCY_PK_ID | SRCE_EFF_START_TMSP | SRCE_EFF_END_TMSP | SRCE_SYS_CD | AGCY_GID | AGCY_NM | AGCY_TERR_CD | AGCY_CD | PROD_RO_NM |
|---|---|---|---|---|---|---|---|---|---|
| 101021128473 | 1016200000001353 | 1/25/2010 | 12/31/9999 | SLS | 124726 | ZEN-ACME CO. | 12 | 113 | OHIO |
| 1016200000001353 | 1016200000001353 | 1/25/2010 | 12/31/9999 | SLS | 124726 | ZEN-ACME CO. | 12 | 113 | OHIO |

- 908 AGCY_PK_ID_ORIG
- 904 AGCY_NM
- 902, 906

| MO_END_SNPSHT_DT_PK_ID | AGMT_GID | AGMT_PK_ID | NB_QUOTE_UNS USS_CNT | NB_OPEN_CKT | AGCY_PK_ID | AGCY_NM |
|---|---|---|---|---|---|---|
| 20060131 | 4098936 | 10112002251 9255 | | 0 | 101021128473 | ZEN-ACME CO. |
| 20051231 | 4098936 | 10112002251 9255 | 1 | 0 | 101021128473 | ZEN-ACME CO. |
| 20051130 | 4098936 | 10112002251 9255 | 1 | 0 | 101021128473 | ZEN-ACME CO. |
| 20051031 | 4098936 | 10112002251 9255 | 1 | 0 | 101021128473 | ZEN-ACME CO. |
| 20050930 | 4098936 | 10112002251 9255 | 1 | 0 | 101021128473 | ZEN-ACME CO. |
| 20050831 | 4098936 | 10112002251 9255 | 1 | 0 | 101021128473 | ZEN-ACME CO. |
| 20050731 | 4098936 | 10112002251 9255 | 1 | 0 | 101021128473 | ZEN-ACME CO. |
| 20050630 | 4098936 | 10112002251 9255 | 1 | 0 | 101021128473 | ZEN-ACME CO. |
| 20050531 | 4098936 | 10112002251 9255 | 1 | 0 | 101021128473 | ZEN-ACME CO. |
| 20050430 | 4098936 | 10112002251 9255 | 0 | 0 | 101021128473 | ZEN-ACME CO. |
| 20050331 | 4098936 | 10112002254 8769 | 0 | 0 | 101021128473 | ZEN-ACME CO. |
| 20050228 | 4098936 | 10112002297 1787 | 0 | 1 | 101021128473 | ZEN-ACME CO. |
| 20050131 | 4098936 | 10112002265 5799 | 0 | 1 | 101021128473 | ZEN-ACME CO. |

QUERY VIEW/REPORT

*FIG. 10*

| MO_END_SNPSHT_DT_PK_ID | AGMT_GID | AGMT_PK_ID | NB_QUOTE_UNS_USS_CNT | NB_OPEN_CKT | AGCY_PK_ID | AGCY_NM |
|---|---|---|---|---|---|---|
| 20060131 | 4098936 | 10112002251925 | 1 | 0 | 101021128473 | ZEN-ACME CO. |
| 20051231 | 4098936 | 10112002251925 | 1 | 0 | 101021128473 | ZEN-ACME CO. |
| 20051130 | 4098936 | 10112002251925 | 1 | 0 | 101021128473 | ZEN-ACME CO. |
| 20051031 | 4098936 | 10112002251925 | 1 | 0 | 101021128473 | ZEN-ACME CO. |
| 20050930 | 4098936 | 10112002251925 | 1 | 0 | 101021128473 | ZEN-ACME CO. |
| 20050831 | 4098936 | 10112002251925 | 1 | 0 | 101021128473 | ZEN-ACME CO. |
| 20050731 | 4098936 | 10112002251925 | 1 | 0 | 101021128473 | ZEN-ACME CO. |
| 20050630 | 4098936 | 10112002251925 | 1 | 0 | 101021128473 | ZEN-ACME CO. |
| 20050531 | 4098936 | 10112002251925 | 1 | 0 | 101021128473 | ZEN-ACME CO. |
| 20050430 | 4098936 | 10112002254876 | 0 | 0 | 101021128473 | ZEN-ACME CO. |
| 20050331 | 4098936 | 10112002251925 | 0 | 0 | 101021128473 | ZEN-ACME CO. |
| 20050228 | 4098936 | 10112002297178 | 0 | 1 | 101021128473 | ZEN-ACME CO. |
| 20050131 | 4098936 | 10112002265579 | 0 | 1 | 101021128473 | ZEN-ACME CO. |

FIG. 11

SYSTEM AND METHOD FOR PROCESSING AND ANALYZING DIMENSION DATA

FIELD

The present invention relates to computerized data storage and retrieval systems.

BACKGROUND

A "data warehouse" is a well-known technique for storing large volumes of complex data in a manner that facilitates periodic as well as on-demand reporting. A data warehouse has been defined as a "collection of data, from a variety of sources, organized to provide useful guidance to an organization's decision makers". It is also well-known to design data warehouses in accordance with a number of conventional schemas, including a "star" schema, as illustrated in FIG. 1. In the schema shown in FIG. 1, a fact table 102 references several dimension tables 104, 106, 108, 110. According to a simple illustrative example, the fact table 102 may store data relating to sales transactions in a retail store chain. The first dimension table 104 may correspond to a "date" dimension that stores date-related attributes (e.g., year, month, day_of_month, day_of_week, etc.) for the sales transactions. The second dimension table 106 may correspond to a "store" dimension including attributes that identify individual stores in the chain. (Such attributes may include store_number, city, state, country, region, etc.) The third dimension table 108 may correspond to an "employee" dimension, having attributes such as employee_name, employee_id, supervisor, department, etc. The fourth dimension table 110 may correspond to a "product" dimension, with attributes such as product_name, product_id, brand, product_category, etc.

The fact table 102 may store basic facts for each transaction, such as number of units sold and price per unit. Each entry in the fact table also contains the primary keys of entries in the dimension tables to tie the entry in the fact table to the corresponding dimension attribute values in the entries in the dimension tables.

The star schema illustrated in FIG. 1, and similar schemas, are examples of dimensional data modeling. One issue to be faced in dimensional data modeling is how to deal with so-called "slowly changing dimensions". In the example described above relative to FIG. 1, the value of the "employee_name" attribute for a given employee may change on occasion if, for example, an employee's marital status changes. There are a number of conventional approaches for handling slowly changing dimensions (SCDs). According to "Type I" changes, the new data is simply written over the previous data entry in the dimension table. This has the disadvantage of wiping out all history.

According to "Type II" changes, a new row with a new primary key is inserted in the dimension table to reflect the change, with starting and ending effective dates included in the new row and the prior row.

"Type III" changes have conventionally been used to facilitate analysis based on either the new or prior attribute value. In this technique, an additional attribute (i.e., a new column) is added to the dimension table. In the example, described above, the new column in the employee dimension table 108 may be headed "original_employee_name", and the "employee_name" attribute/column may be re-designated as "current_employee_name". One disadvantage of Type III handling of SCDs is that the addition of new columns to the dimension table may require costly redesign of the schema itself. Further, providing additional columns to accommodate dimension value changes may significantly increase the size and cost of the data warehouse, particularly in actual typical implementations that include dozens or even hundreds of different attributes among a number of different dimension tables.

SUMMARY

An apparatus, method, computer system and computer-readable data storage medium are disclosed which include operating a processor to combine a first row of a dimension table with a second row of the dimension table to produce a combined row in a history restatement view. The combined row includes a row identification key for the first row and a row identification key for the second row. The row identification key for the first row joins the combined row to fact data from a prior time period. The second row corresponds to a current time period that is later than the prior time period. The apparatus, method, computer system and computer-readable data storage medium also include operating the processor to join at least a portion of the combined row to at least a portion of a corresponding row in a fact table associated with the dimension table. The fact data from the prior time period is included in the corresponding row in the fact table.

In this manner, history stored in a dimension table can be "re-stated" cost-effectively while associating the current value of a dimension attribute with fact data from a previous time period.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 7 is a simplified illustration in tabular form of a fact table that is part of the schema of FIG. 6.

FIG. 8 is a simplified tabular illustration of one of the dimension tables of the schema of FIG. 6.

FIG. 9 is a simplified tabular illustration of a non-persistent history restatement view produced from the table of FIG. 8 in accordance with aspects of the present invention.

FIG. 10 is a simplified query view/report produced in accordance with aspects of the present invention from the fact table of FIG. 7 and the history restatement view of FIG. 9.

FIG. 11 is a screen display provided to a user of the system of FIG. 3 in accordance with aspects of the present invention.

DETAILED DESCRIPTION

In general, and for the purposes of introducing concepts of embodiments of the present invention, a department of an insurance company, such as a marketing department, uses dimensional data modeling with one or more fact tables and dimension tables associated with the fact table. For slowly changing dimension attributes—such as the name of an insurance agency—a dimension table is updated with a new row to represent a change in an attribute value, and column entries in the new row and a prior row indicate effective dates of the rows. A query view or report that includes historical data has the updated attribute value associated with the historical data. To produce the query view with "restated" history, the dimension table is joined to itself to produce a non-persistent history restatement view and then the non-persistent history restatement view is joined to the fact table.

The technique of the present invention elegantly handles changes in dimension attribute values in a cost-effective manner by suitable construction of database queries and without requiring redesign of the data warehouse schema or proliferation of dimension table columns to accommodate changes in dimension attribute values.

Figure 2:
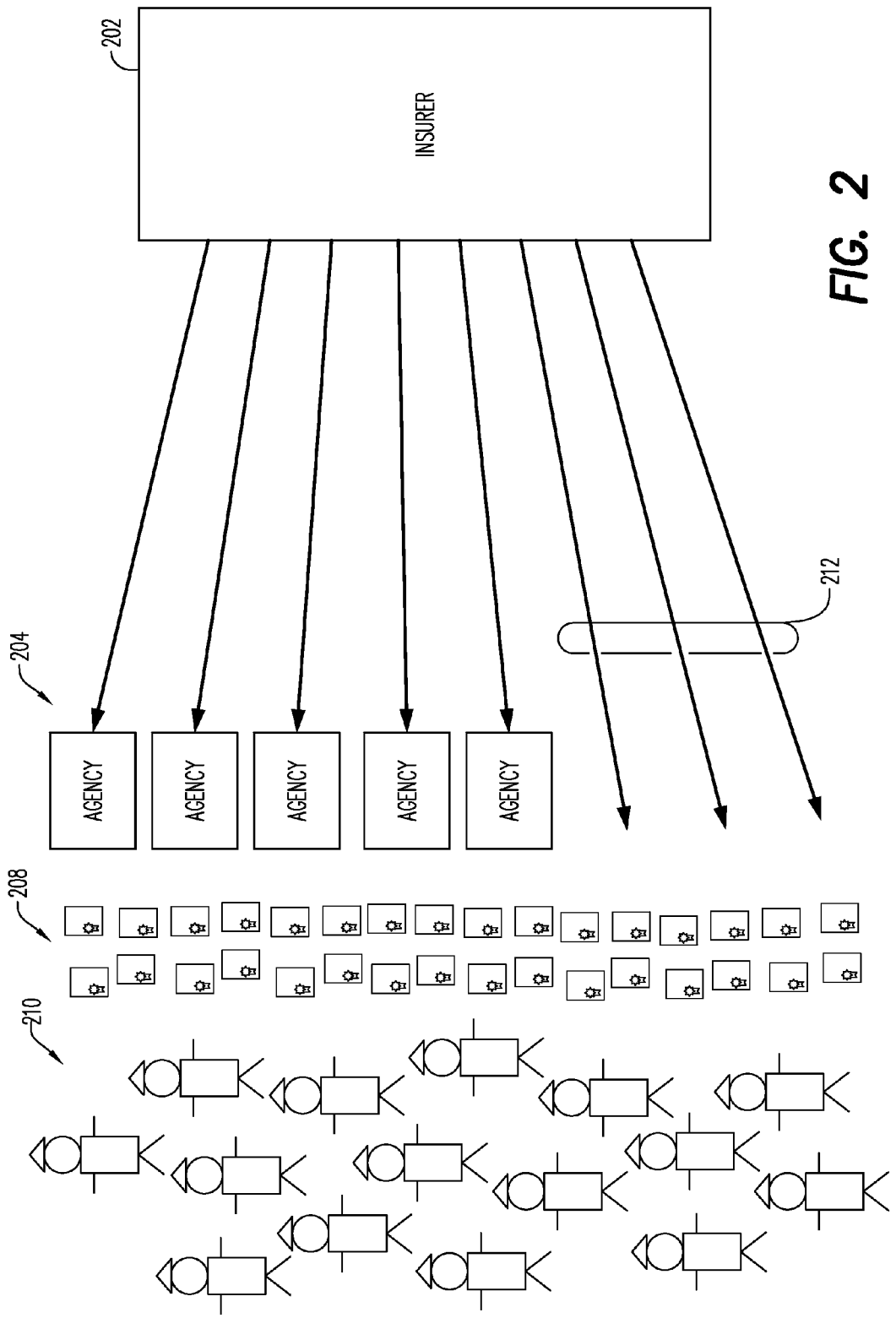
FIG. 2 schematically illustrates a business environment in which the present invention may be applied.

FIG. 2 schematically illustrates a business environment in which the present invention may be applied.

In FIG. 2, block 202 represents an insurance company. At least some marketing activities of the insurance company 202 are performed by insurance agencies 204 supervised by the sales department (not separately indicated) of the insurance company 202. The insurance agencies 204 write insurance policies 208 (issued by the insurance company 202) for insureds 210. (Although the insureds 210 are depicted as individuals, they may alternatively or in addition be large or small corporations or other organizations.) As indicated by arrows 212 in FIG. 2, in some instances the insurance company 202 may issue policies 208 directly to insureds 210 without involvement by insurance agencies. In an example embodiment of the invention as described below, the insurance company 202 operates and maintains a data warehouse (not separately shown in FIG. 2) regarding at least a portion of the activities of its network of agents.

Figure 3:
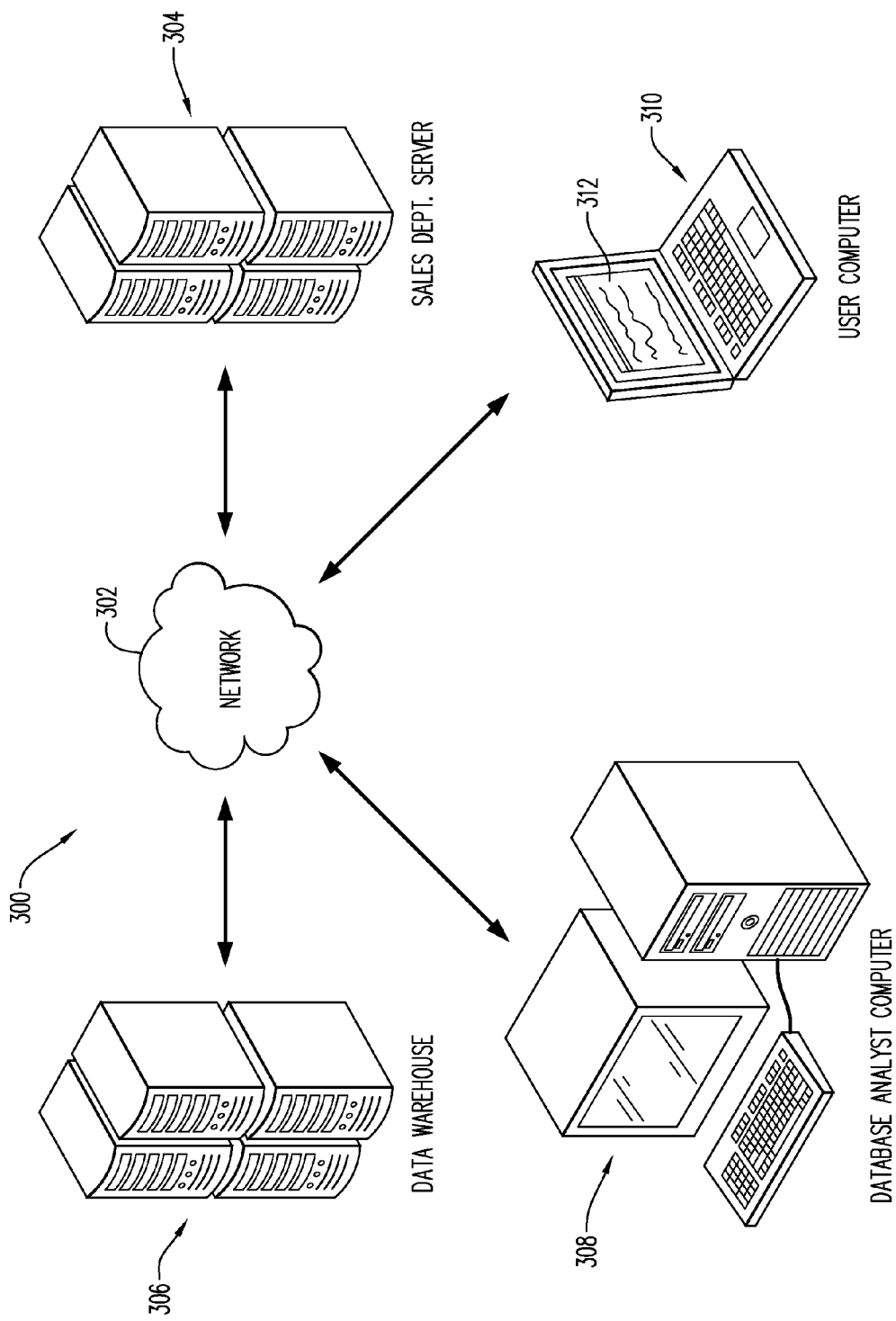
FIG. 3 is a block diagram that illustrates a computer system in which the present invention is applied.

FIG. 3 is a block diagram that illustrates a computer system 300 in which the present invention is applied. The computer system 300 may be operated by the insurance company 202.

The computer system 300 may include a conventional data communication network 302. Further the computer system 300 may include a server computer 304 that is operated by or on behalf of the sales department of the insurance company 202. The sales department server computer 304 is coupled to the data communication network 302, and may generate and/or receive information relating to activities of the agent network for the insurance company.

The computer system 300 may also include a data warehouse 306. The data warehouse 306 is also coupled to the data communication network 302 and may receive data for storage from a number of sources, including the sales department server computer 304. (Sources of data other than the sales department server computer 304 are not shown.) As is conventional, the data warehouse 306 includes one or more data storage hardware units (e.g., a bank of hard disk drives), which are not separately shown. As will be discussed in more detail below, the data warehouse 306 may store data in accordance with a dimensional data model, and the data in the data warehouse 306 may be manipulated in accordance with principles of the present invention as described below. Operation of the data warehouse 306 may be managed with conventional database management software.

Further, the computer system 300 may include one or more personal computers 308 (of which only one is depicted in the drawing) that are operated by employees of the insurance company who serve as database analysts. The database analyst computer 308 is coupled to the data communication network 302 and may serve as a user terminal for the computer system 300 and/or for the data warehouse 306. The database analysts (not shown) may respond to requests for reports from system users by generating database queries that are applied to the data warehouse 306 to retrieve data needed by the system users.

Still further, the computer system 300 may include a number (potentially a large number) of personal computers and/or notebook computers or the like that are operated by employees of the insurance company 202. The user computers 310 (of which only one is depicted in FIG. 3) are coupled to the data communication network 302 and may, among other functions, be used by the users to view reports (e.g., as indicated by reference numeral 312) generated from the data stored in the data warehouse 306. The user computer 310 may function as a user terminal for the computer system 300 and/or for the data warehouse 306.

In some embodiments, all of the hardware aspects of the computer system 300 are conventional, but data may be stored in the data warehouse 306, and user input may be provided, such that the computer system 300 is operated in accordance with principles of the present invention, as discussed below. The computer system 300 may also include other components that are not depicted in the drawing, and may perform functions in addition to those explicitly described herein.

Figure 4:
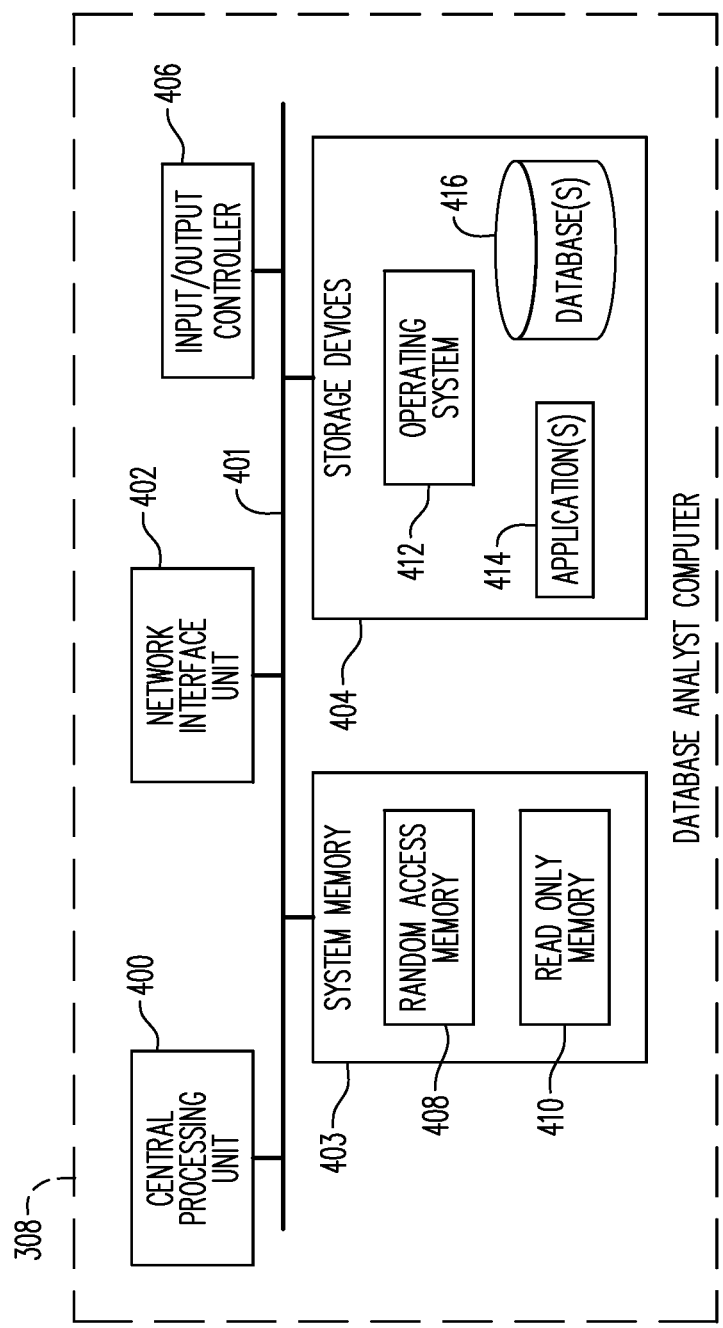
FIG. 4 is block diagram that illustrates a computer used by a database analyst in the system of FIG. 3.

FIG. 4 is a block diagram representation of the database analyst computer 308 shown in FIG. 3. The database analyst computer 308 may be conventional in terms of its hardware aspects.

As depicted in FIG. 4, the database analyst computer 308 includes a data bus 401. The database analyst computer 308 also includes a computer processor (CPU) 400 which is operatively coupled to the data bus 401 and which may be constituted by one or more conventional processors. The database analyst computer 308 further includes a network interface unit 402, system memory 403, one or more storage devices 404, and an input/output controller 406, all of which are also operatively coupled to the data bus 401.

The network interface unit 402 may function to facilitate communication with, for example, other devices (such as the data warehouse 306 and/or user computer(s) 310 shown in FIG. 3). The input/output controller 406 may couple the database analyst computer 308 to input and output devices (not shown) such as a keyboard, a keypad, a mouse or other pointing device, a microphone, knob or a switch, an infra-red (IR) port, a docking station, a touch screen, a display (e.g., a display screen), a speaker, and/or a printer.

The system memory 403 may be constituted by, for example, a suitable combination of Random Access Memory (RAM) devices 408 and Read Only Memory (ROM) devices 410.

Storage devices 404 may comprise any appropriate information storage device, including combinations of magnetic storage devices (e.g., magnetic tape and hard disk drives), optical storage devices, and/or semiconductor memory devices. At least some of these devices (and/or all or part of the system memory 403) may be considered computer-readable storage media, or may include such media.

Storage devices 404 store one or more programs (at least some of which being indicated by blocks 412, 414) for controlling CPU 200. CPU 200 performs instructions of the programs, and thereby operates in accordance with aspects of the present invention. In some embodiments, the programs may include one or more conventional operating systems, indicated by block 412 in FIG. 4. The programs may further include application programs (block 414) such as a conventional data communication program and a conventional database management program. For example, the application programs 414 may provide a conventional user interface by which the user/database analyst may generate SQL queries for application to the data warehouse 306 from the database analyst computer 308.

There may also be stored in the storage devices 404 other software, such as device drivers, etc.

Still further, the storage devices 404 may store one or more databases (block 416) for storing and managing the data relating to user requests handled by the database analyst.

Figure 5:
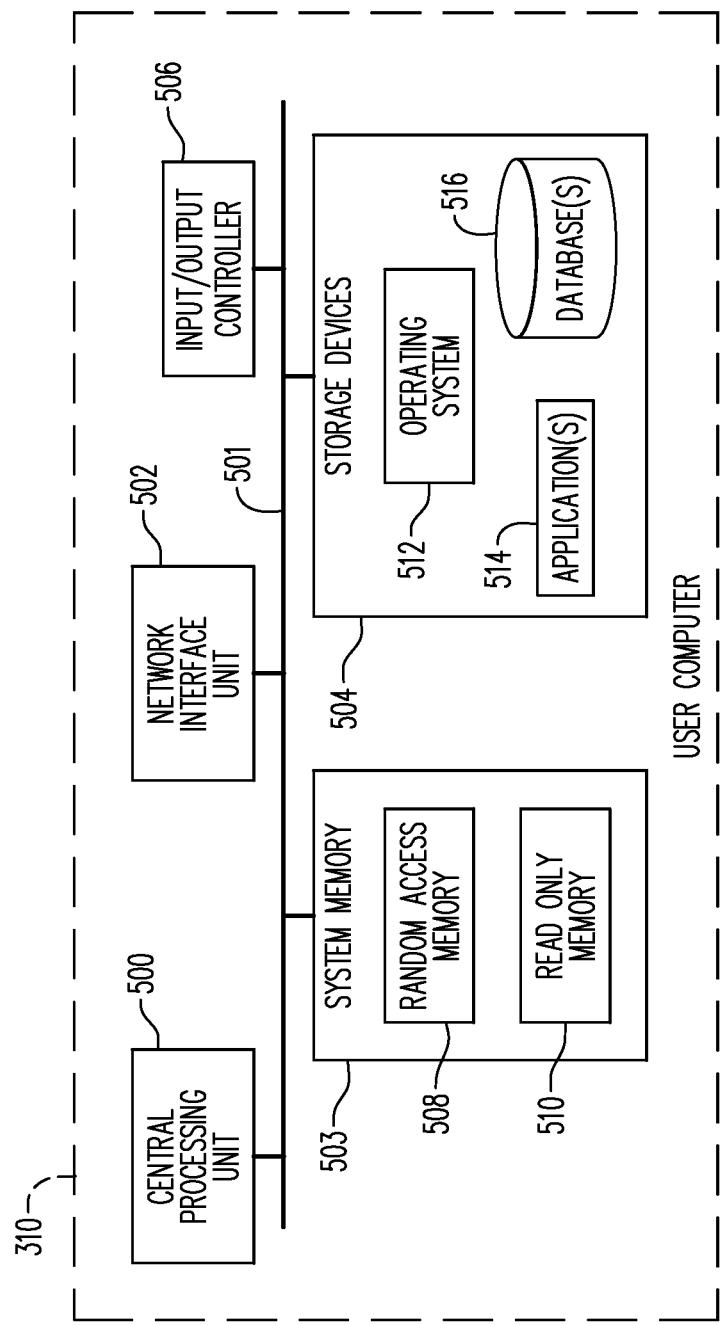
FIG. 5 is a block diagram that illustrates a computer used by an end user of the system of FIG. 3.

FIG. 5 is a block diagram that illustrates a typical user computer 310 as shown in FIG. 3.

The user computer 310, like the database analyst computer 308, may be conventional in its hardware aspects, and may have the same hardware architecture as described above in connection with FIG. 4. Accordingly, the hardware aspects of the user computer 310 will not be described in detail, but will instead be briefly noted. That is, the user computer 310 may include a data bus 501, to which a CPU 500, a network interface unit 502, a system memory 503, one or more storage devices 504 and an input/output controller 506 are connected. The input/output controller 506 may couple the user computer 310 to one or more of the same types of input and/or output devices as were listed above in connection with the database analyst computer 308. As before, the system memory 503 may be constituted by RAM 508 and/or ROM 510, and the storage devices 504 (e.g., magnetic, optical and/or semiconductor memory devices) may store an OS 512, application programs 514 and one or more databases 516. The application programs 514 may, for example, include a conventional electronic mail program and a conventional browser.

Figure 6:
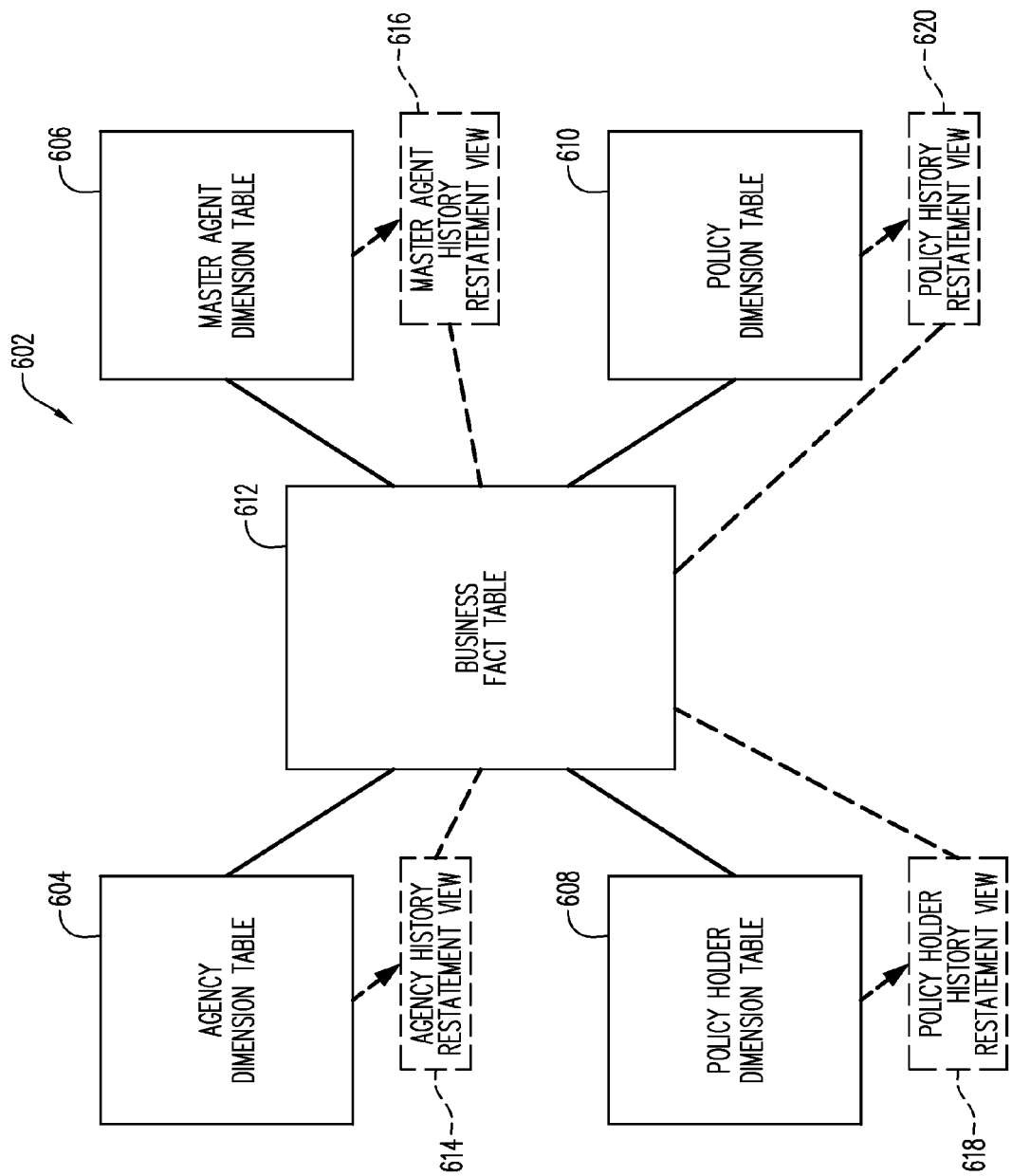
FIG. 6 shows a schema for a data warehouse that incorporates aspects of the present invention.

FIG. 6 shows a "star" schema 602 used as a dimensional data model for the data warehouse 306 in a simplified example embodiment of the present invention. In the schema 602, an agency dimension table 604, a master agent dimension table 606, a policy holder dimension table 608 and a policy dimension table 610 are associated with a fact table 612 which stores data relating to writing of insurance policies issued or to be issued by the insurance company 202. Details concerning the constituent tables of the schema 602 will be provided below.

Also, in accordance with aspects of the invention, one or more history restatement views 614, 616, 618, 620 may be generated, as required, by operation of suitable queries on the dimension tables 604, 606, 608, 610. Details of the history restatement views, and a description of the techniques for providing them, will be set forth below.

FIG. 7 shows, in tabular form, a simplified example of the fact table 612. In a practical embodiment of the fact table 612, there may be many more rows and columns than the number shown in FIG. 7. For example, in actual embodiments of the fact table, there may be hundreds of thousands, or millions, of rows, rather than the dozen or so rows shown in the drawing. There also may be, for example, considerably more than the six columns shown.

In the fact table 612, a first column 702 contains a primary key identifier (PK_ID) for the row in question. The row PK_ID uniquely identifies the particular row in the fact table, and in this example corresponds to a month-end date over a period from January 2005 through January 2006. As implicitly indicated by the column heading 704 for column 702, the rows contain "snapshots" of marketing data as of month-end for the respective months.

The "facts" in question relate to the number of unsuccessful new business quotes (column 706) and the number of new policies written (column 708) for the month in question.

Column 710 contains the global identifier for the particular insurance policy to which the fact in question relates. Thus, the information in column 710 relates the row in the fact table to entries in the policy dimension table 610 (FIG. 6). Column 712 contains the primary key identifiers for relevant rows in the policy dimension table 610. Column 714 contains primary key identifiers for relevant rows in the agency dimension table 604 (FIG. 6). (It will be appreciated that the fact table may contain other columns, which are not shown, to relate rows in the fact table to entries in the policy holder dimension table 608 and the master agent dimension table 606.)

FIG. 8 is a simplified illustration of the agency dimension table 604. As will be understood from the ensuing discussion, the example agency dimension table 604 shown in FIG. 8 illustrates a case of a slowly changing dimension value—in this case the name of an agency (column 802), changed effective Jan. 25, 2010 from "Acme Co." to "Zen-Acme Co."

Each row in the agency dimension table 604 is uniquely identified by its primary key identifier (AGCY_PK_ID), contained in column 804. The effective dates for each row are indicated by an effective start date value (column 806) and an effective end date value (column 808). Column 810 indicates the source of the attribute value information stored in the agency dimension table 604 (in this example, the source is the sales department server computer 304, indicated by the code "SLS"). Column 812 contains the global identifier ("GID") used to uniquely identify each agency across all tables in the data warehouse 306. For purposes of the agency dimension table 604 each agency is uniquely identified by a combination of two codes—namely the agency territory code (column 814) and the agency code (column 816) that uniquely identifies the agency within the territory. Column 818 contains the attribute value that indicates the production region in which the agency operates.

In the simplified example illustration in FIG. 8, the agency dimension table 604 is shown as having two rows. Row 820 corresponds to the original name (Acme Co.) of the agency, and was entered into the agency dimension table 604 when the agency first became affiliated with the insurance company 202 (or when the data warehouse 306 was first created). In column 806, row 820 has a minimum-possible effective start date (which indicates that the name value "Acme Co." was the first name by which the agency was known to the insurance company). In column 808, row 820 has an effective end date of Jan. 24, 2010, which is the last date before the agency name was changed.

Row 822 corresponds to the current name (Zen-Acme Co.) of the agency, and was added to the agency dimension table 604 at the time the agency name change became effective. In column 806, row 822 has an effective start date of Jan. 25, 2010, which is the date the name change became effective. In column 808, row 822 has a maximum-possible effective end date (i.e., in this example, "Dec. 31, 9999"), which indicates that this row contains the current value of the agency name. Row 822 was added to the agency dimension table 604 at the time of the name change for the agency, and at that time the effective end date (column 808) for row 820 was changed to the value shown in FIG. 8, to reflect the name change.

Both rows 820 and 822 present attribute values, for different time periods, for the same agency, having the agency_gid value "12476". The agency may be referred to as an "entity", and indeed any data object or item for which one or more dimension table rows are provided may be referred to as an "entity". In the example schema illustrated in FIG. 6, other entities may include master agents, policy holders, and insurance policies or agreements.

It will be noted that each of the two rows has a different primary key identifier (AGCY_PK_ID)—the identifier for row 820 is "101021128473"; the identifier for row 822 is "101620000001353". Aside from the effective dates and the changed agency name, the information in the two rows is the same in each column.

Also, comparing the effective dates in row 820 with column 702 in the fact table (FIG. 7), it will be recognized that, at the times represented by the fact data in the fact table, the agency in question was known as "Acme Co."

Although only two rows are illustrated in agency dimension table 604, in practical embodiments of such a dimension table or other dimension tables there are likely to be many more rows, such as one or more rows for each agency or other type of entity that is the subject of the dimension table.

The dimension tables 606, 608, 610 may be similar in format to dimension table 604, but may store attribute values for the respective dimensions to which they pertain. For instance, the policy holder dimension table 608 may store values of attributes such as "last_name", "first_name", "middle_initial", "street_address", "apartment_number", "city", "state", etc. The master agent dimension table 606 may store values of attributes such as "master_agent_name", "territory_code", "master_agent_code", etc. The policy dimension table 610 may store values of attributes such as "policy_number", "policy_type", "renewal_date", etc. Each row in each dimension table may include a primary key identifier that is specific and unique to that particular row. At least in some cases of slowly changing dimensions, attribute value changes may be implemented in the same manner as in the example shown in FIG. 8, with a new row added for the entity in question when the attribute value is changed, and appropriate start and end effective dates for both the new row and prior row or rows.

For purposes of this example, it will next be assumed that a user of the computer system 300 requests, from a database analyst, a report concerning sales activities of the Zen-Acme agency during the period January 2005 to January 2006. For example, the user may make this request by sending an electronic mail message from the user computer 310 for retrieval by the database analyst computer 308. (It will be appreciated that the computer system 300 may include a conventional electronic mail server computer, which is not shown.)

Upon receiving the electronic mail message, the database analyst prepares a database query designed to generate the desired report. Because the agency in question is now known as "Zen-Acme Co.", the database analyst recognizes that for purposes of presentation and clear understanding, it is desirable that the report consistently refer to the agency by its current name, even though it had a different name at the time period of the requested information. To achieve this goal, the database analyst generates a database query in accordance with principles of the present invention, as will now be described.

With part of the query, the database analyst generates a non-persistent history restatement view 614, as illustrated for example in FIG. 9. This is done by effecting a self-join on the agency dimension table 604 to combine row 822 with row 820 such that the current agency name "Zen-Acme Co." is associated with the time period during which the previous agency name was in effect. The following is an example of a query that effects such a self-join on the agency dimension table 604:

```
CREATE OR REPLACE VIEW agency_dim_tw_vw AS
SELECT ag1.agcy_pk_id agcy_pk_id_orig, ag2.*
    FROM edw_dm.agency_dim ag1,
        (SELECT*
            FROM edw_dm.agency_dim
            WHERE TO_CHAR(srce_eff_end_tmsp,
                'YYYYMMDD') = '99991231') ag2
    WHERE ag1.agcy_gid = ag2.agcy_gid;
```

The inner portion of this query (lines 4-6) selects only the "latest" rows (i.e., rows having the maximum effective end date—in this case only row 822 in the agency dimension table 604, FIG. 8). The outer portion of this query (lines 1-3 and 7) joins the latest row from the inner portion of the query, as identified by the alias "ag2", back to all of the rows in the agency dimension table that have the common "GID" attribute (agcy_gid). Referring to line 2 of the query, selecting the original agcy_pk_id from the outer portion of the query (aliased as "ag1") and giving that PK_ID the alias name "agcy_pk_id_orig" allows the rows from the resulting history restatement view (FIG. 9) to be joined back to the correct row(s) of the fact table 612.

Referring now to the history restatement view 614 shown in FIG. 9, it will be noted that row 902 corresponds to the combination of row 820 of the agency dimension table 604 with row 822 of the agency dimension table 604, such that the current agency name "Zen-Acme Co." is inserted in the agency name column 904. Row 906 corresponds to the combination of row 822 of the agency dimension table 604 with itself. It will also be noted that the history restatement view includes a column 908 not present in the agency dimension table 604. The new column 908 corresponds to the new alias name "agcy_pk_id_orig" and the values in the rows for that column correspond to the values in column 804 (agcy_pk_) in the agency dimension table 604.

In some embodiments, as noted above, the history restatement view may be non-persistent. In other embodiments, however, the history restatement view may be materialized, and thus become persistent.

The query set forth above may be nested within a query statement to join the history restatement view 614 with the fact table by joining agcy_pk_id_orig in the history restatement view with agcy_pk_id in the fact table. As a result, in this particular example, row 902 in FIG. 9 is joined with all of the rows of the fact table 612 (FIG. 7) to produce the query view (report) shown in FIG. 10. It will be noted that column 1002 in FIG. 10 (agency name) reflects the current value of that attribute ("Zen-Acme Co.") in association with past facts/metrics from the fact table 612 (shown in columns 1004 and 1006 in FIG. 10).

The table shown in FIG. 10 represents the report requested by the system user. The database analyst may complete handling of the user's request by sending, from the database analyst computer 308 to the user computer 310 (e.g., by electronic mail), a hyperlink to be used for accessing the report. The system user may use the user computer 310 to view the report, which may be displayed by the user computer 310, as shown for example in the screen display illustrated in FIG. 11.

In the example described with reference to FIGS. 6-11, only one dimension attribute value is changed, in only one dimension table. However, in other examples, more than one attribute value may be changed, in only one dimension table, or in more than one dimension table. Moreover, in the example set forth above, the attribute value has changed only once. In other examples, however, the attribute value may be changed two or more times. In such cases, a new row may be added to the dimension table in question on each occasion that the attribute value is changed.

In some embodiments of history restatement views, two or more different updated attribute values (e.g., for two or more entities) may be associated with prior period primary key identifiers.

As suggested by FIG. 6, in the case of some queries, several history restatement views may be created.

Figure 12:
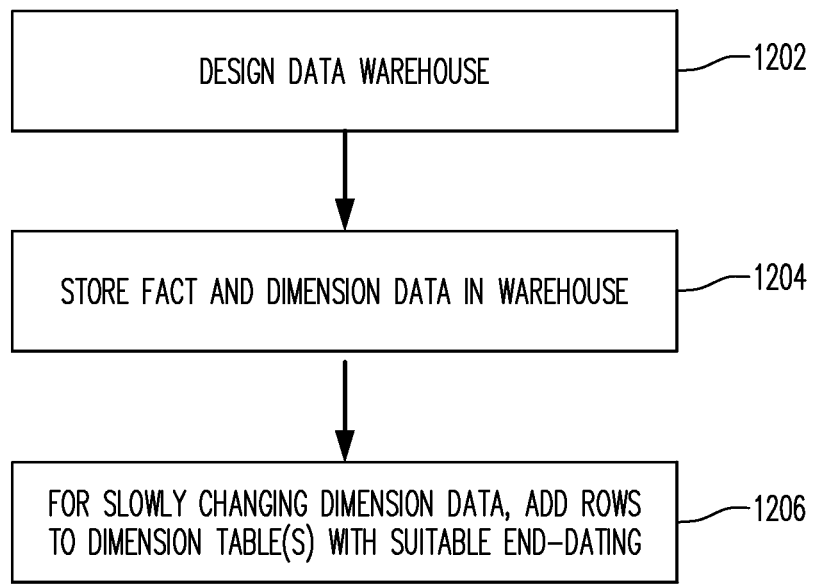
FIGS. 12 and 13 are flow charts that represent processes performed in the system of FIG. 3 in accordance with aspects of the present invention.
Figure 13:
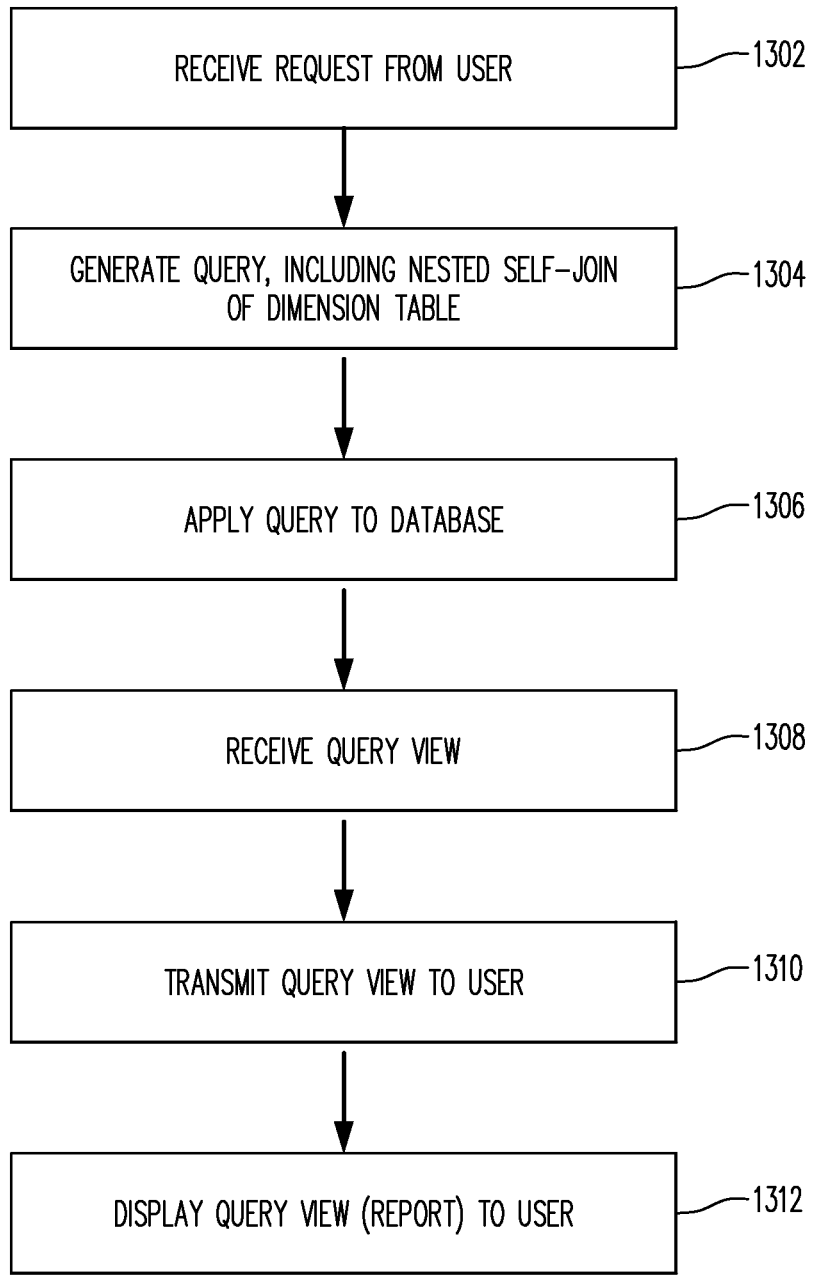

FIGS. 12 and 13 illustrate in flow-chart form processes that may be performed in accordance with aspects of the present invention in the computer system 300 to implement techniques like those described above in connection with FIGS. 6-11.

Figure 1:
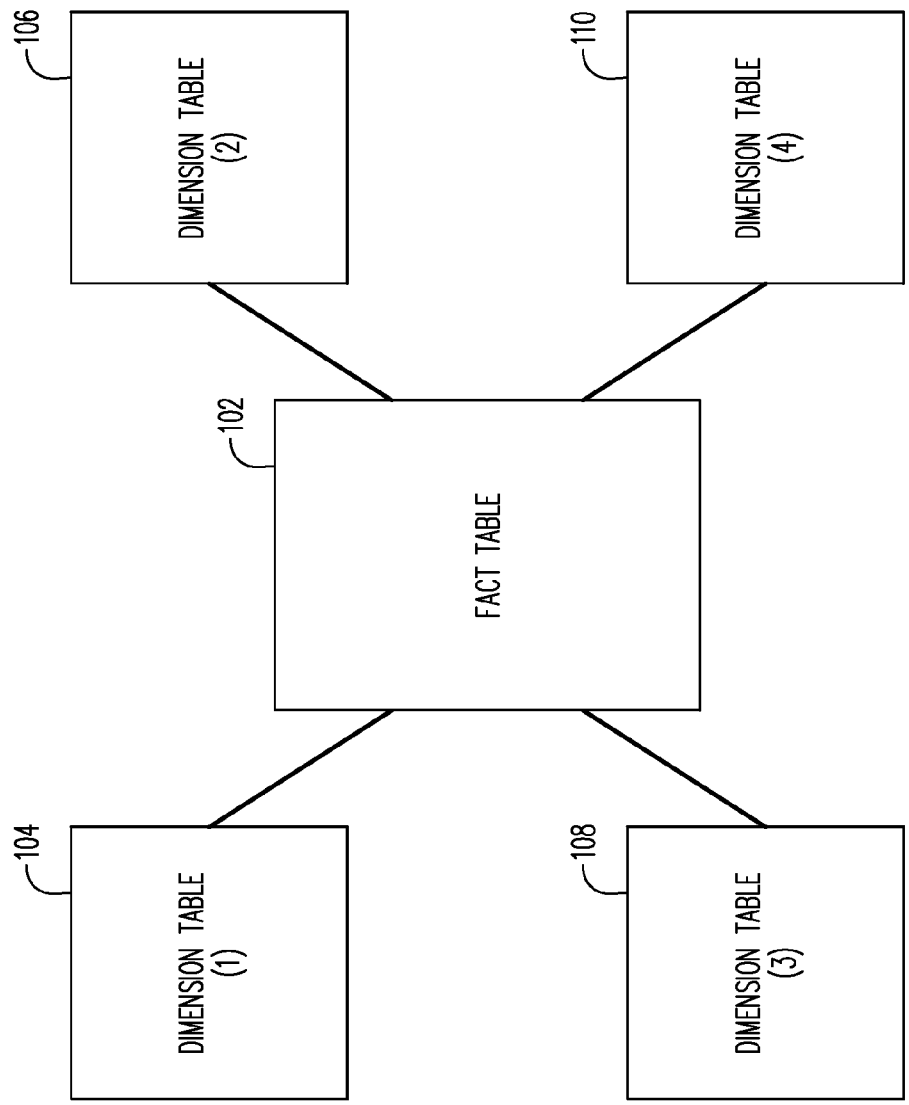
FIG. 1 illustrates a conventional schema for a data warehouse.

At 1202 in FIG. 1, a data warehouse is designed. This data warehouse may resemble the data warehouse 306 described above. The design of the data warehouse may include design of a dimensional data modeling schema, which may be a "star" schema, a "snowflake" schema, or any other schema in which one or more dimension tables are associated with one or more fact tables. The number of dimension tables in the schema may be more or fewer than the four dimension tables shown in FIG. 6. The data warehouse design may be suitable for storing data relating to activities of a network of insurance agents, as in the above-described examples, or for storing data relating to any other aspect of an insurance company or of any other organization. For example, the data warehouse may be designed to store data relating to human resource matters, claims under insurance policies, billing and collection of insurance policy premiums, insurance policy issuance and administration, direct marketing activities, sales in a retail store chain or other retail environment, manufacturing operations, accounts receivable, accounts payable or other types of data commonly stored in data warehouses.

At 1204, fact data and dimension attribute values may be stored in the data warehouse in accordance with the schema. As is conventional, each row in the fact table may include primary key identifiers that correspond to relevant rows in the dimension tables.

At 1206, dimension tables are updated on occasions when dimension attribute values change. In at least some cases when a dimension attribute value is changed, a new row is added to the dimension table affected, with the corresponding previous row being end-dated (i.e., the effective end date for the previous row changed) to reflect the effective date of the change in attribute value, and with the new row given an effective end date equal to a nominal maximum value, such as "9999/12/31".

FIG. 13 is concerned with handling a particular user request for data from the data warehouse. At 1302, the database analyst receives the user's request. At 1304, the database analyst operates the database analyst computer 308 to generate a suitable database query, including a self-join on at least one dimension table to associate one or more current dimension attribute values with fact data for previous time periods. An example of such a query is described above in connection with the views shown in FIGS. 9 and 10.

At 1306, the query is applied to the data warehouse to produce the desired query view. At 1308 the query view is received, and at 1310, the query view is transmitted to the user who made the request. At 1312, the query view is displayed to the user at the user's computer (e.g., on the display component of the user computer 310, as seen in FIG. 3). In addition, or alternatively, the query view may be printed for the user on a printer which is coupled to the user computer 310, and which is not shown.

Handling slowly changing dimension data in the manner described herein may allow updated dimension attribute values to be displayed in reports in association with prior-period facts, without entailing the substantial costs in IT professional development and maintenance activity, increased data schema size and increased processing time that may be associated with conventional techniques such as "Type III" handling of slowly changing dimensions.

Processes portrayed herein as being performed by one computer may in practice be divided among two or more computers. Processes portrayed herein as being performed by two or more computers may in practice be performed by a single computer. For example, the model generation and prospect selection computer 102 and the marketing computer 108 may be integrated together as a single computer.

The principles of the present invention may be applied in connection with any and all data storage operations that may be used in connection with insurance companies, in connection with other types of financial products besides insurance, and in data warehouses used in other kinds of organizations in addition to insurance companies or financial services companies.

The process descriptions and flow charts contained herein should not be considered to imply a fixed order for performing process steps. Rather, process steps may be performed in any order that is practicable.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of operating a computer system to generate reports from stored insurance data, the method comprising:

operating a processor to interact with an insurance data warehouse including at least one data storage hardware unit storing insurance data according to a schema in which each of a plurality of dimension tables is associated with a fact table containing information regarding insurance policies, wherein the plurality of dimension tables include an insurance agency dimension table, an insurance master agent dimension table, an insurance policy holder dimension table, and an insurance policy dimension table;

operating the processor to combine a first row of one of said dimension tables with a second row of the one of said dimension tables to produce a combined row in a non-persistent history restatement view, the combined row including a row identification key for the first row and a row identification key for the second row, the row identification key for the first row joining the combined row to fact data from a prior time period, the second row corresponding to a current time period that is later than the prior time period; and operating the processor to join at least a portion of the combined row to at least a portion of a corresponding row in a fact table associated with the one of said dimension tables, said fact data from said prior time period included in said corresponding row in said fact table, wherein the history restatement view automatically uses a current value of an attribute for a given entity to replace a previous value for the given entity and includes a query view row entry that includes said current value of the attribute of the given entity and a previous fact value for the given entity where the given entity had at least one prior value of the attribute different than said current value.

2. The method of claim 1, wherein the fact table contains information regarding past insurance policy marketing activities.

3. The method of claim 1, wherein the fact table contains information regarding insurance policies.

4. The method of claim 1, further comprising:

presenting the query view to a user at a terminal, the query view including said at least a portion of the combined row in association with said at least a portion of the corresponding row in the fact table;

wherein the query view is a report derived from said data stored in the insurance data warehouse.

5. A method of operating a computer system, the method comprising:

storing insurance data in an insurance data warehouse according to a schema in which each of a plurality of dimension tables is associated with a fact table containing information regarding insurance policies, at least one of the dimension tables stored in a format having, for a given entity, at least two row entries; the at least two row entries including a current row entry with a maximum effective end date and a prior row entry with an effective end date that is prior to a current point in time, the insurance data warehouse including at least one data storage hardware unit;

generating a query on a terminal for application to the insurance data warehouse, the query for effecting a self-join on a one of said dimension tables that is in said format to combine the current row entry for said given entity with at least one prior row entry for the given entity, the self-join producing a non-persistent history restatement view that automatically uses a current value of an attribute for said given entity to replace a previous value for the given entity, wherein the query comprises nested selections including an inner query portion to select the row having the maximum effective end date and an outer query portion to join the row selected by the inner query portion to all rows in the one of the dimension tables that share a common global identifier attribute, the query further joining the history restatement view to the fact table to produce a query view;

generating the query view from the insurance data warehouse in response to the query;

transmitting the query view from the insurance data warehouse to a user terminal; and presenting the query view to a user at the user terminal, wherein the query view is a report derived from said insurance data stored in the insurance data warehouse and includes a query view row entry that includes the current value of the attribute of the given entity and a previous fact value for the given entity where the given entity had at least one prior value of the attribute different than the current value.

6. The method of claim 5, wherein said prior row entry and said current row entry each have a respective row identification key, the row identification keys being different from each other.

7. The method of claim 6, wherein the history restatement view contains a restatement view row entry that corresponds to the prior row entry, the restatement view row entry including both the row identification key of the current row entry and the row identification key of the prior row entry and having the current value of the attribute in place of a prior value of the attribute.

8. The method of claim 5, wherein the history restatement view is used for insurance agency data.

9. The method of claim 5, wherein the fact table contains information regarding past insurance policy marketing activities.

10. The method of claim 5, wherein the fact table contains information regarding insurance policies.

11. The method of claim 5, wherein the query view is presented to the user as a report that is printed and/or displayed at the user terminal.

* * * * *